(No Model.)
G. STRICKLAND.
LATHE SLIDE REST.
No. 507,047. Patented Oct. 17, 1893.
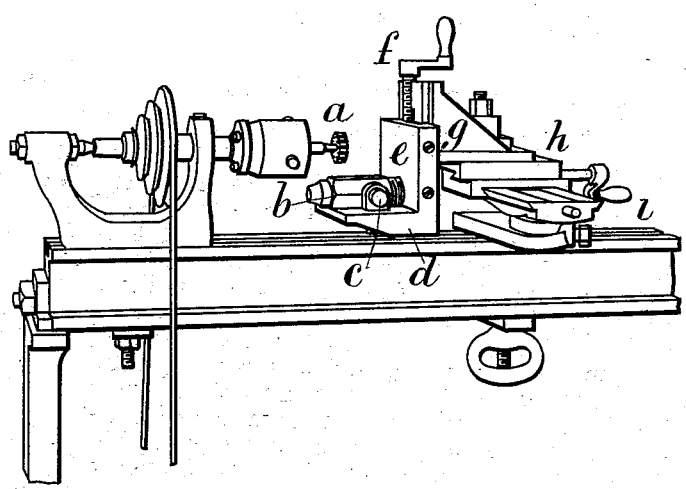
Witnesses.
J. H. Daly.
Robert Ewett.
Inventor.
Gerald Strickland.
By James L. Norris.
Atty.

UNITED STATES PATENT OFFICE.

GERALD STRICKLAND, OF VILLA BOLOGNA, ISLAND OF MALTA.

LATHE SLIDE-REST.

SPECIFICATION forming part of Letters Patent No. 507,047, dated October 17, 1893.

Application filed May 17, 1893. Serial No. 474,575. (No model.)

*To all whom it may concern:*

Be it known that I, GERALD STRICKLAND, Count della Catena, a citizen of Great Britain, residing at Villa Bologna, in the Island of Malta, have invented a new and useful Improvement in Lathe Slide-Rests, of which the following is a specification.

My invention relates to an appliance to the slide rest of a lathe by which I render it suitable for subjecting work in a convenient manner to the action of milling tools or revolving cutters, as I shall describe referring to the accompanying drawing, which shows in perspective the head, mandrel and slide rest of a lathe with my invention applied thereto.

$a$ is a milling tool or revolving cutter.

$b$ is a piece of work, such as a hexagonal nut for a ratchet brace, which is to be milled. In order to subject this work $b$ to the action of the cutter $a$, I fix it by dogs $c$, or in any other known manner, on a horizontal shelf $d$ projecting from a vertical slide $e$ which is worked by a screw and handle $f$, and is held by a bracket $g$ detachably bolted on to the upper of the two slides $h$ and $i$ of an ordinary slide rest. By means of these slides I can move $b$ longitudinally and transversely in the horizontal plane, while, by means of the detachably supported slide $e$, I can move it to or from the cutter $a$ in the vertical plane.

Having thus described the nature of this invention and the best means I know of carrying the same into practical effect, I claim—

The combination with a milling tool and the horizontal slides $h$ and $i$, of the bracket $g$ detachably supported on the upper horizontal slide, and the vertically movable slide $e$ attached to said bracket and having a horizontally projecting shelf $d$ provided with dogs $c$ for holding the work, substantially as shown and described.

In testimony whereof I have signed my name to this specification, in the presence of two subscribing witnesses, this 19th day of April, A. D. 1893.

GERALD STRICKLAND.

Witnesses:
 J. DIBONS,
 C. AGINS.